United States Patent
Giefing et al.

[11] Patent Number: 5,864,363
[45] Date of Patent: Jan. 26, 1999

[54] METHOD AND DEVICE FOR AUTOMATICALLY TAKING A PICTURE OF A PERSON'S FACE

[75] Inventors: Gerd-Jürgen Giefing; Volker Vetter; Thomas Zielke, all of Bochum, Germany

[73] Assignee: C-VIS Computer Vision und Automation Gmbh, Bochum, Germany

[21] Appl. No.: 623,450

[22] Filed: Mar. 28, 1996

[30] Foreign Application Priority Data

Mar. 30, 1995 [DE] Germany ..................... 195 11 713.1

[51] Int. Cl.$^6$ ............................. H04N 7/18; H04N 9/47
[52] U.S. Cl. ........................................ 348/143; 348/169
[58] Field of Search ............................ 348/143, 149, 348/150, 159, 169, 161, 170, 171, 172, 722, 335, 61, 77, 154, 155

[56] References Cited

U.S. PATENT DOCUMENTS

| | | | |
|---|---|---|---|
| 5,012,522 | 4/1991 | Lambert | 382/2 |
| 5,206,721 | 4/1993 | Ashida et al. | 358/85 |
| 5,430,809 | 7/1995 | Tomitaka | 382/173 |

FOREIGN PATENT DOCUMENTS

| | | |
|---|---|---|
| 0514933A2 | 11/1992 | European Pat. Off. . |
| 2172168 | 10/1986 | United Kingdom . |
| 9417636 | 8/1994 | WIPO . |
| WO9417636 | 8/1994 | WIPO . |

*Primary Examiner*—Wendy Garber
*Assistant Examiner*—Christopher Onuaku
*Attorney, Agent, or Firm*—Harness, Dickey & Pierce, P.L.C.

[57] ABSTRACT

A method and device for automatically taking pictures of faces has a device for aligning and setting a camera to automatically take pictures of human faces, especially in connection with the electronic further processing (storage, identification, etc.) of face images. The face of a person is detected with the help of an opto-electronic image processing device to localize the direction of the person and his/her face, as a result of which, as a function of at least one positioning signal of the image processing device, a sensor aligning device (2) controls the viewing direction of the camera (8). The invention permits complete pictures, rich in detail, to be taken of faces (portraits) from a distance of several meters by means of a stationary camera without the need for any manual operations.

7 Claims, 1 Drawing Sheet

METHOD AND DEVICE FOR AUTOMATICALLY TAKING A PICTURE OF A PERSON'S FACE

BACKGROUND OF THE INVENTION

The invention relates to a method and device to automatically take a picture of a person's face.

DE 42 38 743 A1, published May 19, 1994, discloses a controlling device for a videophone where two portrait cameras are used. A precondition for camera functioning is that the face is close to the camera. Thus, from the start, the face fills a large area of the camera image. The person operating the device first has to position the face accurately in front of one of the cameras. This generates a video image which is stored by an image memory. The actual picture taken subsequently is compared with the image in the form of a reference image stored in the image memory. If the position of the image changes, a correction signal is generated accordingly, with the camera following. In this way, the position of the last image is compared with the position of the new picture, with the camera being controlled accordingly. The second portrait camera is not activated until the range covered by the first camera supplies an unfavorable viewing angle for a reproduction. For change-over purposes, use is made of the deflection angle of the respective camera in action. The change-over takes place when the deflection angle exceeds a certain value. To ensure accurate functioning, it is necessary, first, to affect a manual setting operation. Subsequent control takes place in such a way that the camera follows the subject after its displacement. However, this can only take place in a narrow range. If the subject or face leaves the effective range, it is necessary for a new positioning operation to take place in front of one of the two cameras as well as a manual presetting operation because there is no reference image suitable for subsequent controlling purposes.

DE 31 46 552 C2, published Nov. 17, 1983, discloses a device with two cameras with different image angles. The camera with the smaller image angle serves as a search camera by means of which an observer searches an observation range. Such a device is used for military purposes and serves to possibly identify camouflaged objects in the far distance by means of the teleoptics of the camera with the small image angle. In addition to the image produced by the camera with the small image angle and a correspondingly small imaging range, a survey picture is produced which shows the surroundings of the image detail. If the viewing range of the camera with the small image angle is changed, the position of a marking indicating to the viewer the alignment of the search camera (camera with the small image angle) in the survey picture changes at the same time. In consequence, the two cameras are always moved jointly. For this purpose, the cameras are arranged in a joint adjusting device which is rotatable vertically and horizontally.

EP 05 78 508 A2, published Jan. 11, 1994, discloses a device with a built-in video camera which may be pivoted and inclined by actuators. For the user, this device practically constitutes a standard video camera having a special feature in that any faces positioned in the vicinity in front of the picture taking optics are automatically looked at by the camera. Inside the camera, an image processing device is provided in which a simple abstract face model is stored. The model substantially consists in assuming an image region which is characterized by a certain hue and which, upwardly, is delimited by a second image region with a dark grey color value (hair region). However, the device is effective only if the face is positioned almost completely in the viewing range of the camera. This results in a conflict of objectives of, on the one hand, achieving a high-resolution face image and, on the other hand, of keeping the scale of the image small enough for the tracking mechanism not to break down. In consequence, the device described in the above publication can function satisfactorily only in those cases where the face is positioned closely in front of the camera within a narrowly delimited region, as is the case with video telephones or video conference work stations.

SUMMARY OF THE INVENTION

It is an object of the invention to provide a method and device which, within a predetermined viewing range or space region, automatically enables identification and recording of the complete high-resolution image of a face.

In accordance with the invention, the objective is achieved by a method of automatically taking a picture of the face of a person. A search camera is used which covers a certain viewing range at a large image angle. Also, a portrait camera is used which includes a small image angle and covers a small viewing range within the viewing range of the search camera. The portrait camera, with its viewing range, is guided on to a portion of the viewing range of the search camera. The portion is determined by a function of the existing characteristics. The characteristics, at least to a certain degree, conform to characteristics which are predetermined in the form of reference data and which are typical of a face.

Further, in accordance with the invention, a device is disclosed for automatically taking a picture of a face of a person. The device includes means for depositing characteristics which are typical of a face and constitute reference data. The invention includes at least one search camera and covers a certain viewing range at a large image angle. An image data recording means is included, to record the image in the form of image data taken by the search camera. Also included is a means for comparing the above-mentioned image data with respect to the existence and positioning of at least one characteristic corresponding to the reference data within the viewing range of the search camera. Further, at least one portrait camera is included, which includes a small image angle and covers a small viewing range within the viewing range of the search camera. A control device is included which aligns the viewing direction of the portrait camera relative to the portion of the viewing range of the search camera. The portion includes the characteristics corresponding to the reference data.

The invention thus provides a method and device which search a large viewing range, recorded by the search camera, for the existence of characteristics which are typical of a face in order to align the portrait camera as a function of the position and movement of the characteristics. The face is more closely recorded in an imaging scale of a telephoto lens. In addition, it is possible to consider further details of the face.

The method and device also take into account whether the characteristics typical of a face in the viewing range of the search camera are of a certain quality. The search camera itself may be immovably arranged and may be stationary.

According to a further embodiment of the invention, the image data recording means optionally and/or temporarily serve to record the image taken by the portrait camera. The resulting image data, after having been compared with the reference data, serves for further alignment purposes, for definition setting, for setting the optical image size and/or for setting the portrait camera to a detail of the face.

Furthermore, the search camera and/or the portrait camera include at least one opto-electronic surface sensor. The sensor is especially in the form of a CCD camera or CMOS camera. The surface sensor is used to generate an electronic image signal. In addition, according to a further embodiment of the invention, the electronic image signal generated by the portrait camera is used to automatically identify a face for automatic storage and remote transmission purposes. Such an application is suitable for automatic access control purposes for example.

Finally, according to yet a further embodiment, as a result of a releasing signal, the image signal is processed further by a face image processing device. The releasing signal is generated as a function of the degree of conformity with reference data deposited in the storage unit. This means that the face image is not processed any further until a certain image quality has been achieved.

BRIEF DESCRIPTION OF THE DRAWINGS

A preferred embodiment and the method in accordance with the invention will be explained below in greater detail with reference to the one and only FIGURE provided in the form of a block diagram.

DETAILED DESCRIPTION OF THE DRAWINGS

Figure 1:
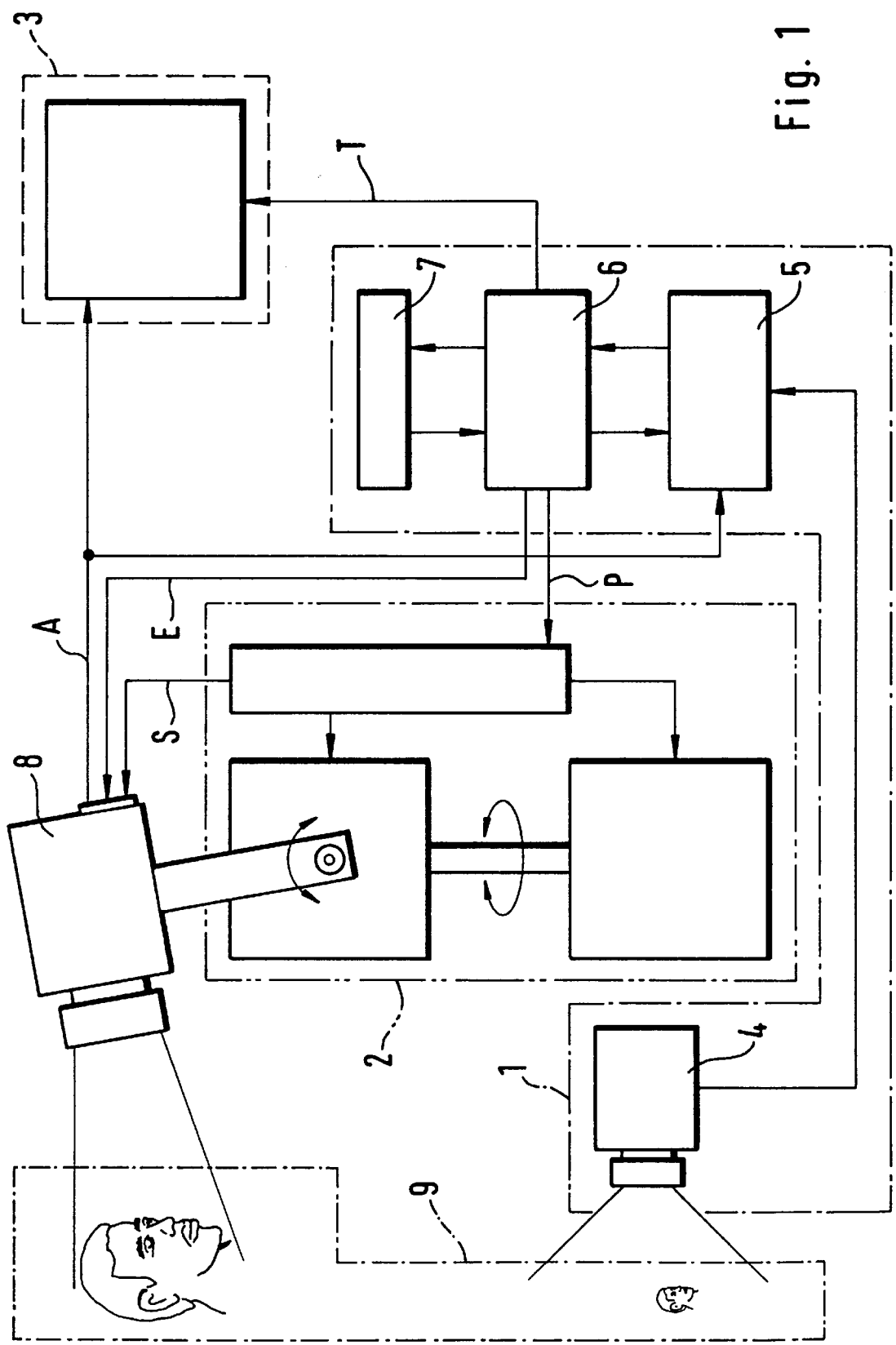

The image processing device 1 shown in FIG. 1 includes a search camera 4 to record special characteristics 9 of a face of a person. The search camera 4 includes at least one opto-electronic surface sensor with its associated imaging optics. In one embodiment, the search camera 4 is a CCD or CMOS camera including a lens with a short focal length (large image angle). In an advantageous embodiment, the viewing range of the search camera 4 includes at least the entire viewing range covered by a portrait camera 8 by changing its alignment.

The portrait camera 8, typically, includes a small image angle (tele-optical imaging), with its viewing direction being set by the aligning device 2. The search camera 4 includes an image angle which is relatively large (wide angle imaging) compared to that of the portrait camera 8. The viewing direction is either fixed or changeable by pivoting the entire assembly 2, 4, 8.

The data processing and comparing device 6 compares the recorded characteristics 9 with the reference characteristics deposited in the storage unit, for example, in the form of the color of certain surface elements of image points on the sensor surface. The aligning device 2 connected to the portrait camera 8 is controlled as a function of the X-Y position of the identified characteristics on the sensor surface of the search camera 4. In an embodiment of the invention, the aligning device 2 is a camera pivoting/inclining head movable by an actuator in two degrees of freedom and holding the portrait camera 8.

It is also possible to integrate the portrait camera 8 and aligning device 2 into a device for controllably taking pictures. Furthermore, the aligning device 2 can be put into effect without including mechanically movable parts. This is accomplished by selectively choosing a partial region of an extremely large-area sensor. Finally, it is possible to integrate the entire image processing device 1 into an "intelligent camera".

Furthermore, the search camera may include an assembly of two or more CCD cameras covering the entire viewing range which can be scanned by the portrait camera 8 by changing its viewing direction with the help of the aligning device 2. The arrangement may either be fan-like or the viewing ranges may overlap one another. Accordingly, the image data recording unit 5 has to be of the multi-channel type.

As a function of the positioning signal P, the aligning device 2 sets the viewing direction of the portrait camera 8 such that characteristics 9 referring to the face of a person, are produced as centrally as possible in the viewing range of the portrait camera 8. Preferably, as a function of the X-Y position of the relevant characteristics 9 on the sensor surface or sensor surfaces of the search camera 4 and, additionally, as a function of the intensity of the associated image points, the data processing and comparing device 6 generates a setting signal E to the portrait camera 8 such that focus, light control and/or imaging scale (focal length) of the portrait camera 8 can be advantageously set or reset relative to a fixed face. In particular, it is possible to provide the search camera 4 in the form of a stereo camera. For example, the camera may be in the form of two CCD cameras arranged side by side. In this way, by carrying out stereo comparative measurements, the distance from the viewed person can be determined from the X-Y position of the characteristics 9 on at least two sensor faces of the search camera 4. Thus, this improves the accuracy with which the portrait camera 8 is aligned by the aligning device 2. The accuracy is also improved with which the focus and imaging scale (focal length) of the portrait camera are set as a function of the setting signal E.

If the portrait camera 8 supplies an electronic image signal A, it is possible to feed the electronic image signal A of the portrait camera 8 additionally into the image data recording unit 5. In such a case, it is possible, as a function of the characteristic details of the face such as eye, nose or mouth, to cause the data processing and comparing device 6 to precision-align the portrait camera 8. Such characteristic details are identified by comparing them with reference characteristics stored in the storage unit 7.

Furthermore, the portrait camera 8 may include an assembly of two or more CCD cameras or two or more different types of opto-electronic surface sensors with the associated imaging optics. In such a case, it is possible, in principle, to change the viewing direction of the portrait camera 8 by electronically changing over between the individual image sensors in a discrete form. The aligning device 2 can utilize the possibility of specifying a certain viewing direction in that, by means of the change-over signal S, a partial step is carried out of the total change in viewing direction predetermined by the positioning signal P.

If, furthermore, a face image processing device 3 is used, a releasing signal T will be generated which, as a function of the degree of similarity (comparative quality) of the detected face characteristic 9 with the reference characteristics stored in the storage unit 7, indicates the points in time for taking a picture and evaluates same by giving them a quality value. The releasing signal T can be generated by the data processing and comparing device 6 by means of the facial characteristics 9 of the search camera 4 and/or the portrait camera 8.

The method and device in accordance with the invention enable format-filling pictures, rich in detail, of the face of a person to be taken automatically by a camera from a distance of several meters. For example, it is possible to take high-quality face photographs by monitoring cameras from typical locations of attachment, such as entries or counters. At present, such automatic face photography is possible only if a person is positioned very closely in front of a wide-angle camera or if the person in question is given very detailed positioning and posturing instructions.

One example of taking advantage of the invention is to use same for the long-term observation of patients suffering from epilepsy. In such a case, the face image processing device 3 is provided in the form of a recording instrument which automatically effects a synchronous storage of face images and simultaneously measured neurological signals of the patient under observation.

A further example of the face image processing device 3 is a system for automatically identifying a face and person from a video image. By means of the method and device in accordance with the invention it is possible, by making use of the device to identify a face and person, to achieve an access or entry monitoring system which checks the identity of persons while they pass the monitoring point.

A further embodiment of the face image processing device 3 includes a device to identify a person entitled to use a vehicle, as described in the U.S. patent application Ser. No. 08/433,611, the specification and drawings of which are expressly incorporated herein by reference.

While the above detailed description describes the preferred embodiment of the present invention, the invention is susceptible to modification, variation and alteration without deviating from the scope and fair meaning of the subjoined claims.

We claim:

1. A method for automatically taking a picture of the face of a person comprising:

providing a search camera which covers a desired viewing range at a large image angle, and a portrait camera which comprises a small image angle and covers a small viewing range within the viewing range of the search camera;

guiding said portrait camera on to a portion of the viewing range of the search camera;

storing only predetermined facial characteristics in the form of facial reference data typical of a face; and determining said portion as a function of the existence of facial characteristics of a person being viewed by comparing said facial characteristics with said stored predetermined facial characteristics.

2. A device for automatically taking a picture of the face of a person comprising:

means for storing only predetermined facial characteristics which are typical of a face and are provided in the form of facial reference data;

at least one search camera covering a certain viewing range at a large image angle;

image data recording means for recording an image in the form of image data taken by the search camera;

means for comparing said Image data with respect to the existence and positioning of at least one facial characteristic corresponding to the stored facial reference data within the viewing range of the search camera;

at least one portrait camera which comprises a small image angle and covers a small viewing range within the viewing range of said search camera;

a control device for aligning the viewing direction of the portrait camera relative to the portion of the viewing range of the search camera, which portion comprises the facial characteristic(s) corresponding to the facial reference data.

3. A device according to claim 2, wherein said image data recording means optionally and/or temporarily recording the image taken by the portrait camera and the resulting image data, after having been compared with the reference data, enabling further alignment purposes, for definition setting, for setting the optical image size and/or for setting the portrait camera to a detail of the face.

4. A device according to claim 2, wherein said search camera and/or portrait camera comprise at least one optoelectronic surface sensor provided especially in the form of a CCD camera or CMOS camera.

5. A device according to claim 2, wherein said portrait camera generates an electronic image signal.

6. A device according to claim 5, wherein said electronic image signal generated by the portrait camera enables automatically identifying a face, for automatic storage or remote transmission purposes.

7. A device according to claim 6, wherein as a result of a releasing signal, said image signal is proceeded further by a face image processing device and said releasing signal is generated as a function of the degree of conformity reached with reference data deposited in a storage unit.

* * * * *